United States Patent
Anderson

(10) Patent No.: US 11,344,003 B1
(45) Date of Patent: May 31, 2022

(54) ANIMAL CONSTRAINT SYSTEMS

(71) Applicant: Mark Anderson, Shreveport, LA (US)

(72) Inventor: Mark Anderson, Shreveport, LA (US)

( * ) Notice: Subject to any disclaimer, the term of this patent is extended or adjusted under 35 U.S.C. 154(b) by 299 days.

(21) Appl. No.: 16/661,792

(22) Filed: Oct. 23, 2019

Related U.S. Application Data

(60) Provisional application No. 62/749,331, filed on Oct. 23, 2018.

(51) Int. Cl.
*A01K 1/04* (2006.01)
*A01K 1/02* (2006.01)

(52) U.S. Cl.
CPC .............. *A01K 1/04* (2013.01); *A01K 1/0236* (2013.01)

(58) Field of Classification Search
CPC ................................. A01K 1/04; A01K 1/0236
See application file for complete search history.

(56) References Cited

U.S. PATENT DOCUMENTS

| | | | |
|---|---|---|---|
| 1,563,212 A | 11/1925 | Madiar | |
| 3,189,003 A * | 6/1965 | Canfield ................... | A01K 1/04 119/784 |
| 3,203,399 A | 8/1965 | Banks | |
| 4,791,886 A * | 12/1988 | Anderson ................ | A01K 1/04 119/771 |
| 4,862,833 A * | 9/1989 | Brotz ....................... | A01K 1/04 119/785 |
| 5,003,929 A | 4/1991 | Dean | |
| 5,339,773 A * | 8/1994 | Van Druff ................ | A01K 1/04 105/141 |
| 5,746,157 A * | 5/1998 | Warwaruk ............ | A01K 1/0272 119/785 |
| 7,845,312 B2 | 12/2010 | Brown | |
| 2011/0180014 A1 | 7/2011 | Wilder | |

OTHER PUBLICATIONS http://cnbhnp.com/images/sliding-door/round-track-trolley-sliding-door-brochure.pdf (Year: 2018).*
https://www.amazon.com/GoPro-Fetch-Harness-Official-Mount/dp/B00N31FQJS/ref=sr_1_3?dchild=1&keywords=gopro+pet&qid=1633604316&sr=8-3 (Year: 2013).*
https://www.amazon.com/GoPro-CHDHX-401-HERO4-BLACK/dp/B00NIYNUF2/ref=sr_1_3?dchild=1&keywords=go+pro+hero+4&qid=1633604255&sr=8-3 (Year: 2014).*
https://www.amazon.com/Precedent-Bushing-Control-Sleeve-Repair/dp/B07HJG3QKM/ref=sr_1_48?dchild=1&keywords=bushing+with+sleeve&qid=1633605713&sr=8-48 (Year: 2018).*

* cited by examiner

*Primary Examiner* — Timothy D Collins
*Assistant Examiner* — Maria E Graber
(74) *Attorney, Agent, or Firm* — R. Keith Harrison

(57) ABSTRACT

Animal constraint systems may include at least one track suitably configured for mounting on the anchoring structure, the at least one track having a track interior. A track slot may be provided in the at least one track. The track slot may communicate with the track interior. A carriage may be disposed for linear movement in the track interior of the track and protrude from the track interior through the track slot. The carriage may include a carriage frame. At least one carriage roller may be rotatably carried by the carriage frame and disposed in the track interior of the track. A tether line may be connected to the carriage frame. The tether configured for connection to the animal via a collar, harness or the like.

17 Claims, 16 Drawing Sheets

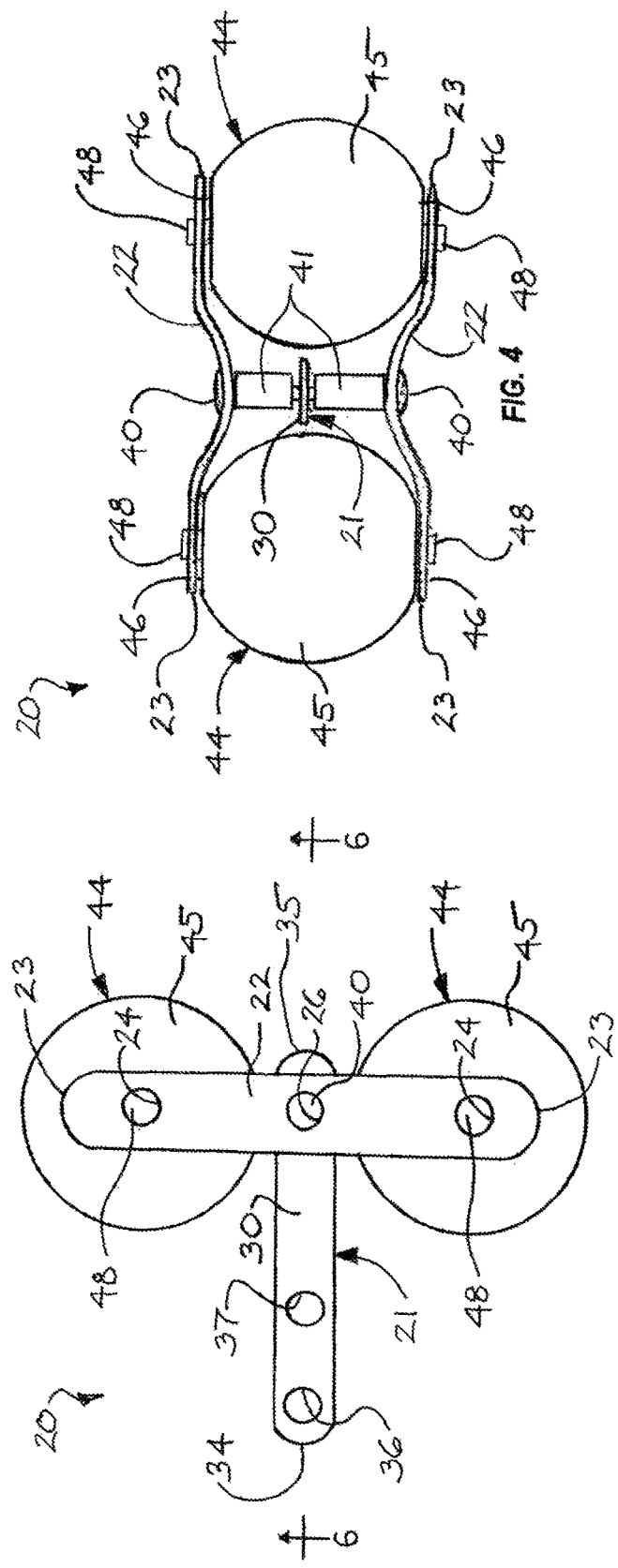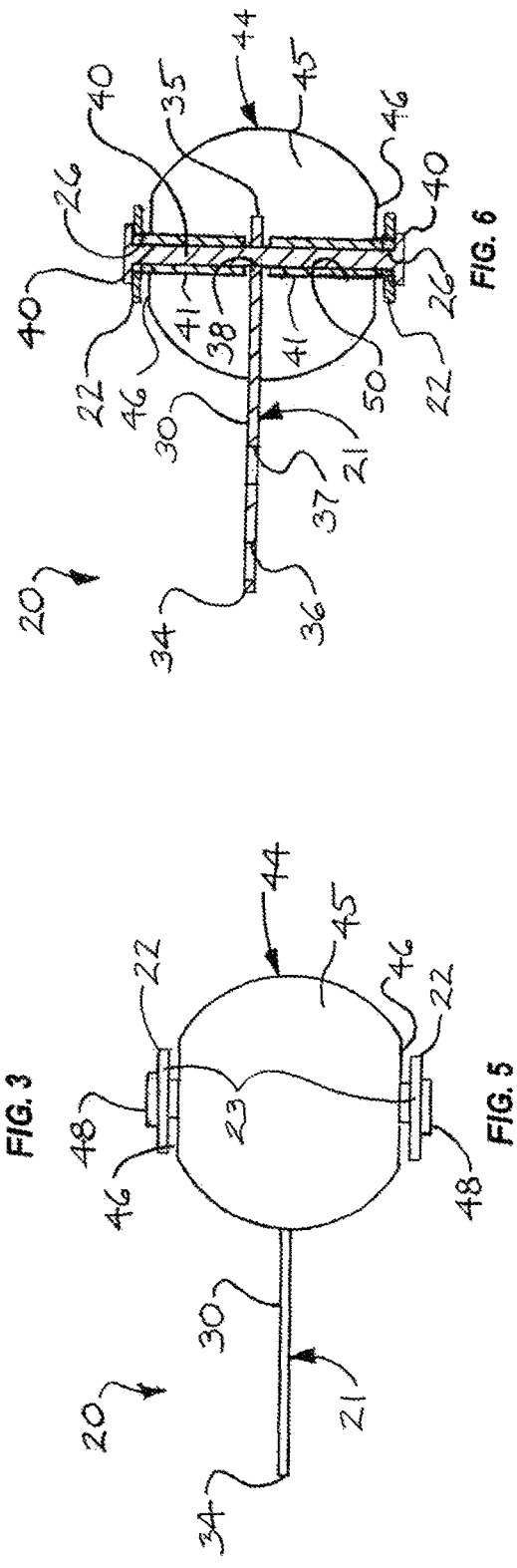

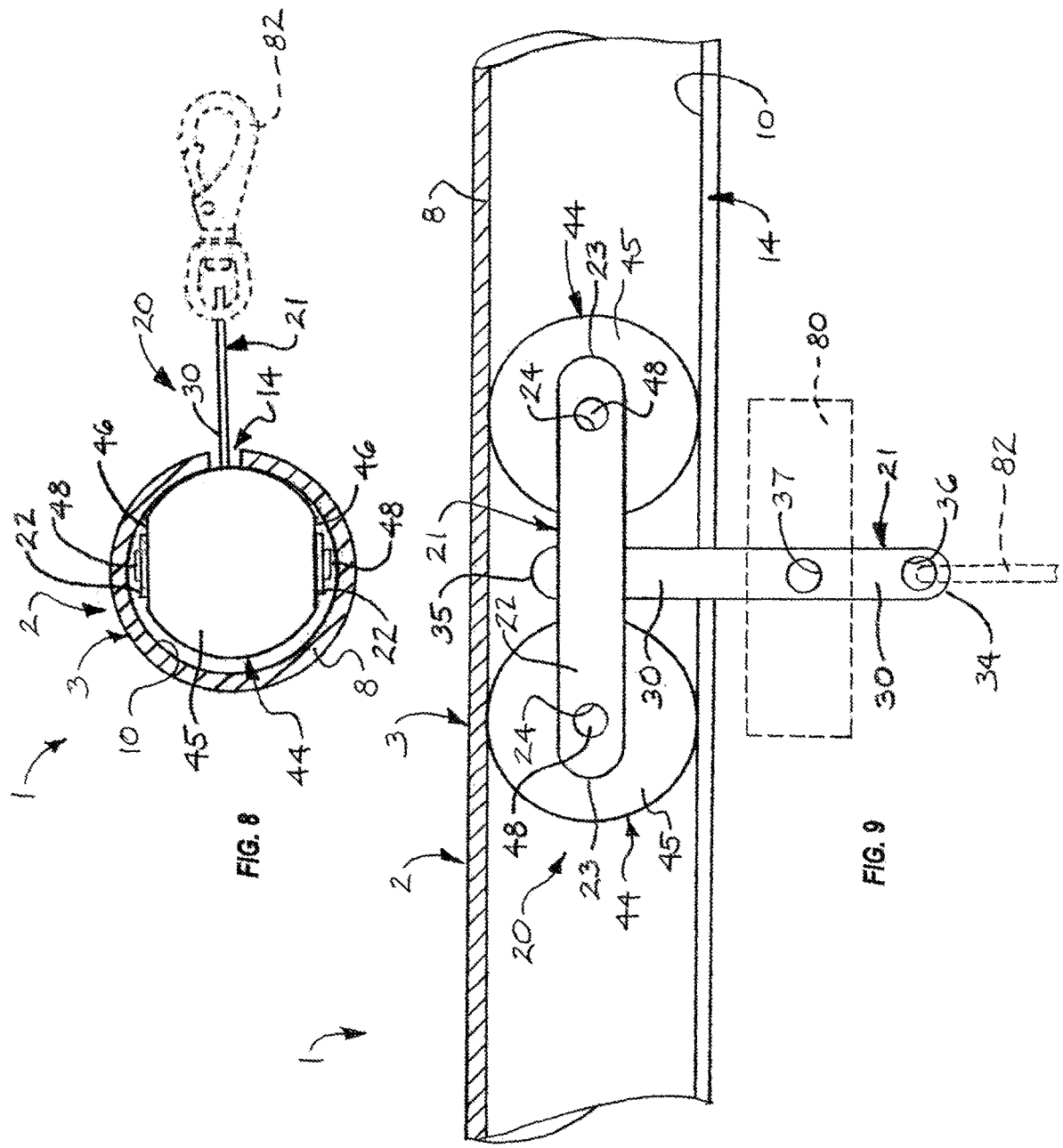

ANIMAL CONSTRAINT SYSTEMS

CROSS-REFERENCE TO RELATED APPLICATIONS

This application claims the benefit of U.S. provisional application No. 62/749,331, filed Oct. 23, 2018 and entitled ANIMAL CONSTRAINT SYSTEMS, which provisional application is hereby incorporated by reference herein in its entirety.

FIELD

Illustrative embodiments of the disclosure generally relate to systems which are suitable for constraining the movements of animals. More particularly, illustrative embodiments of the disclosure relate to animal constraint systems which provide a tethered animal with the freedom to move along or adjacent to an anchoring structure while constraining movement of the animal away from the structure.

SUMMARY

Illustrative embodiments of the disclosure are generally directed to animal constraint systems configured for mounting on an anchoring structure and providing an animal with the freedom to move along or adjacent to the anchoring structure while constraining movement of the animal away from the anchoring structure. An illustrative embodiment of the animal constraint systems may include at least one track suitably configured for mounting on the anchoring structure, the at least one track having a track interior. A track slot may be provided in the at least one track. The track slot may communicate with the track interior. A carriage may be disposed for linear movement in the track interior of the track and protrude from the track interior through the track slot. The carriage may include a carriage frame. At least one carriage roller may be rotatably carried by the carriage frame and disposed in the track interior of the track. A tether line may be connected to the carriage frame. The tether line may be configured for connection to the animal via a collar, harness or the like.

BRIEF DESCRIPTION OF THE DRAWINGS

Illustrative embodiments of the disclosure will now be described, by way of example, with reference to the accompanying drawings, in which:

FIG. 3 is a top view of a typical carriage of an illustrative embodiment of the animal constraint systems;

FIG. 4 is a front view of the carriage illustrated in FIG. 3;

FIG. 5 is a right side view of the carriage illustrated in FIG. 3;

FIG. 6 is a sectional view, taken along section lines 6-6 in FIG. 3, of the carriage;

FIG. 8 is a cross-sectional view, taken along section lines 8-8 in FIG. 7, of the straight track segment, with the carriage rollers of the carriage deployed inside the straight track segment;

FIG. 9 is a longitudinal sectional view of the straight track segment portion, with the carriage rollers of the carriage deployed inside the straight track segment, more particularly illustrating a tether clip (illustrated in phantom) attached to and a camera (also illustrated in phantom) mounted on the carriage in typical application of the animal constraint systems;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper" and "lower" are intended to be used in an illustrative and not a limiting sense. In some applications, therefore, those elements which are identified as "upper" may be located beneath those elements which are identified as "lower" in the following detailed description. For purposes of description herein, such relative terms relate to the position of the progressive shear assembly as illustrated in FIG. 1.

Figure 10:
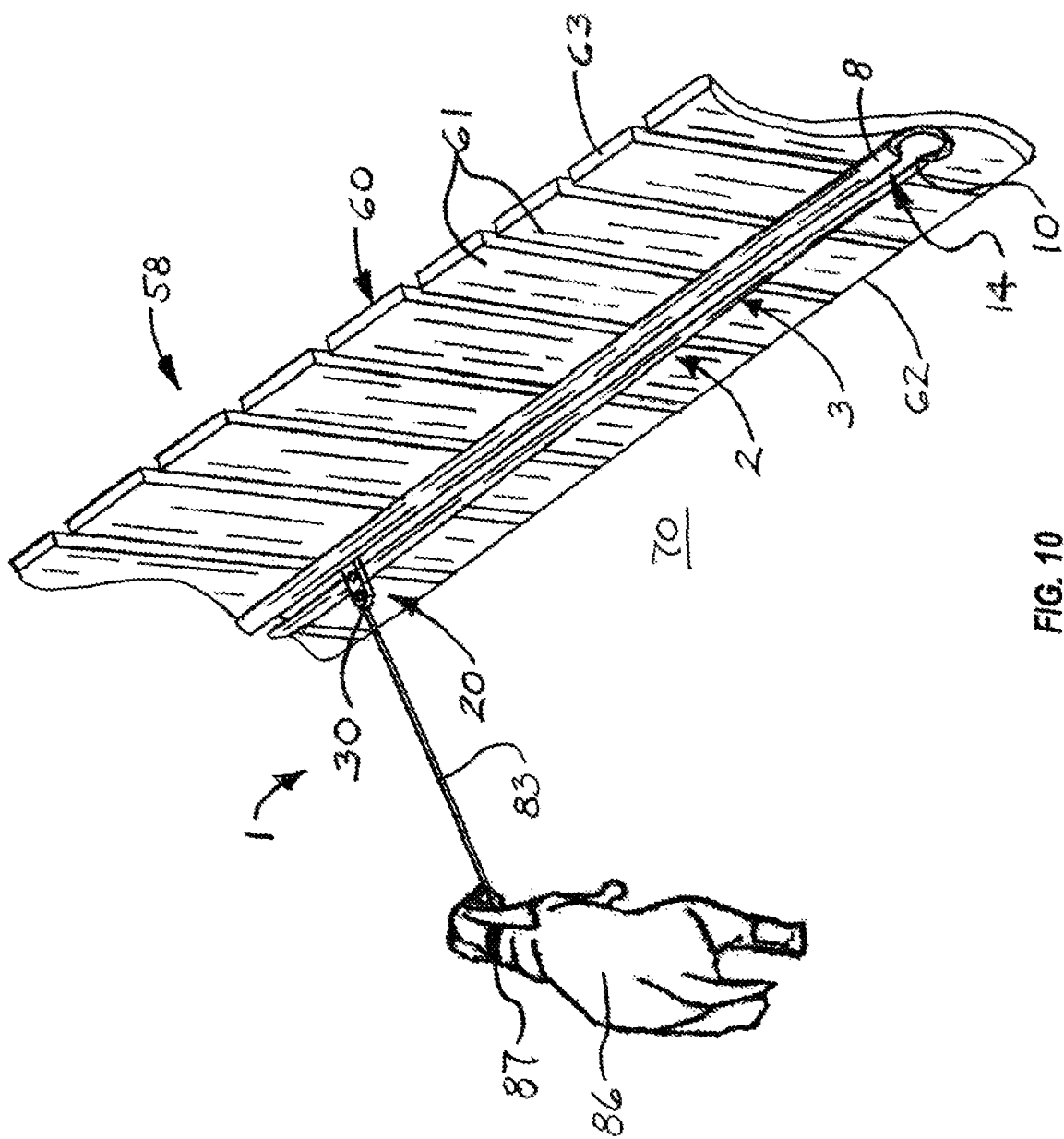
FIG. 10 is a perspective view of a section of a board fence, with a portion of a straight track segment of the tubular track mounted on the fence, a carriage frame of the carriage protruding through a track slot in the straight track segment and an animal tethered to the carriage frame in typical application of the animal constraint systems.
Figure 12:
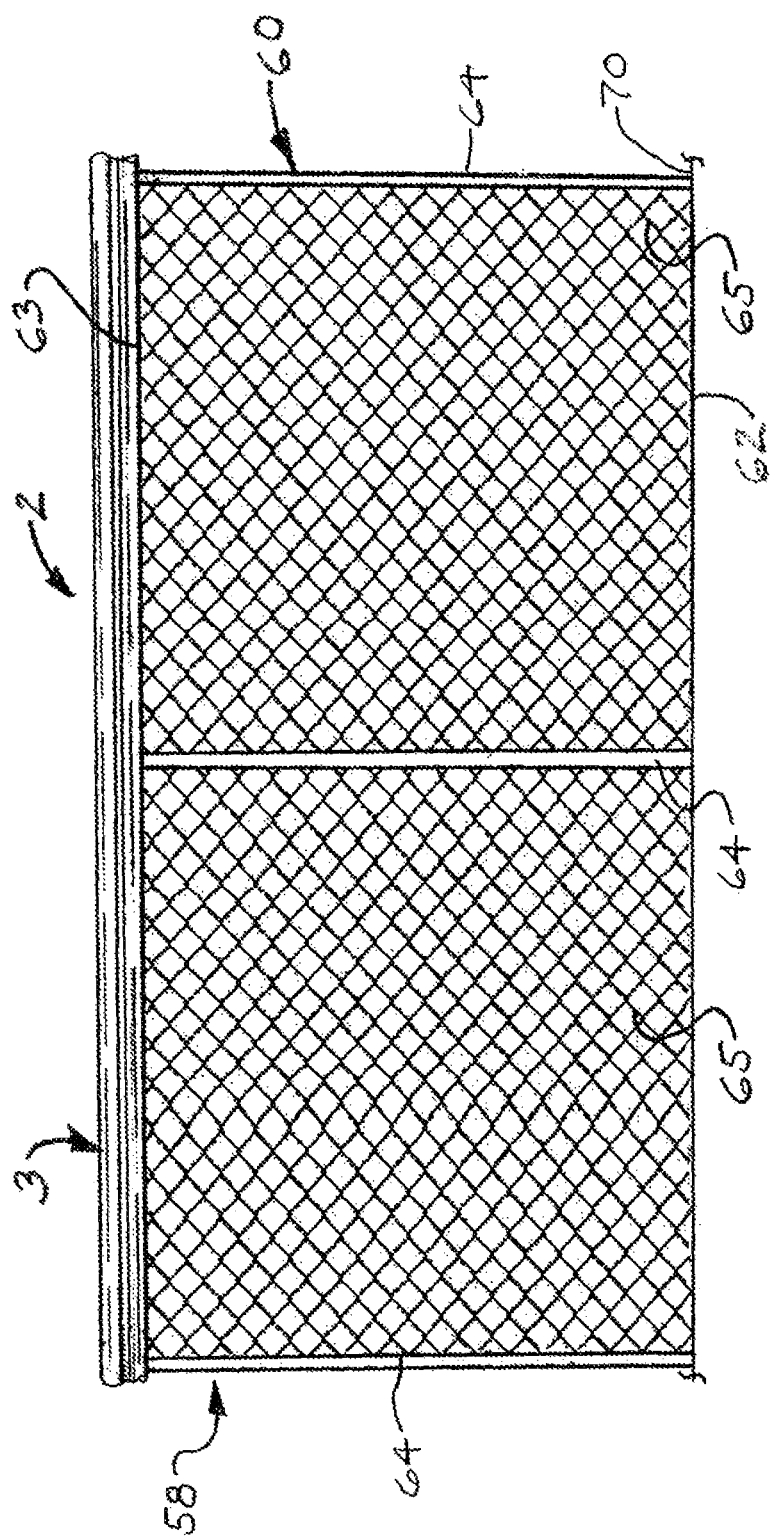
FIG. 12 is a front view of a section of a chain-link fence, with a straight track segment of the track mounted along a fence top edge of the fence according to some applications of the animal constraint systems.
Figure 13:
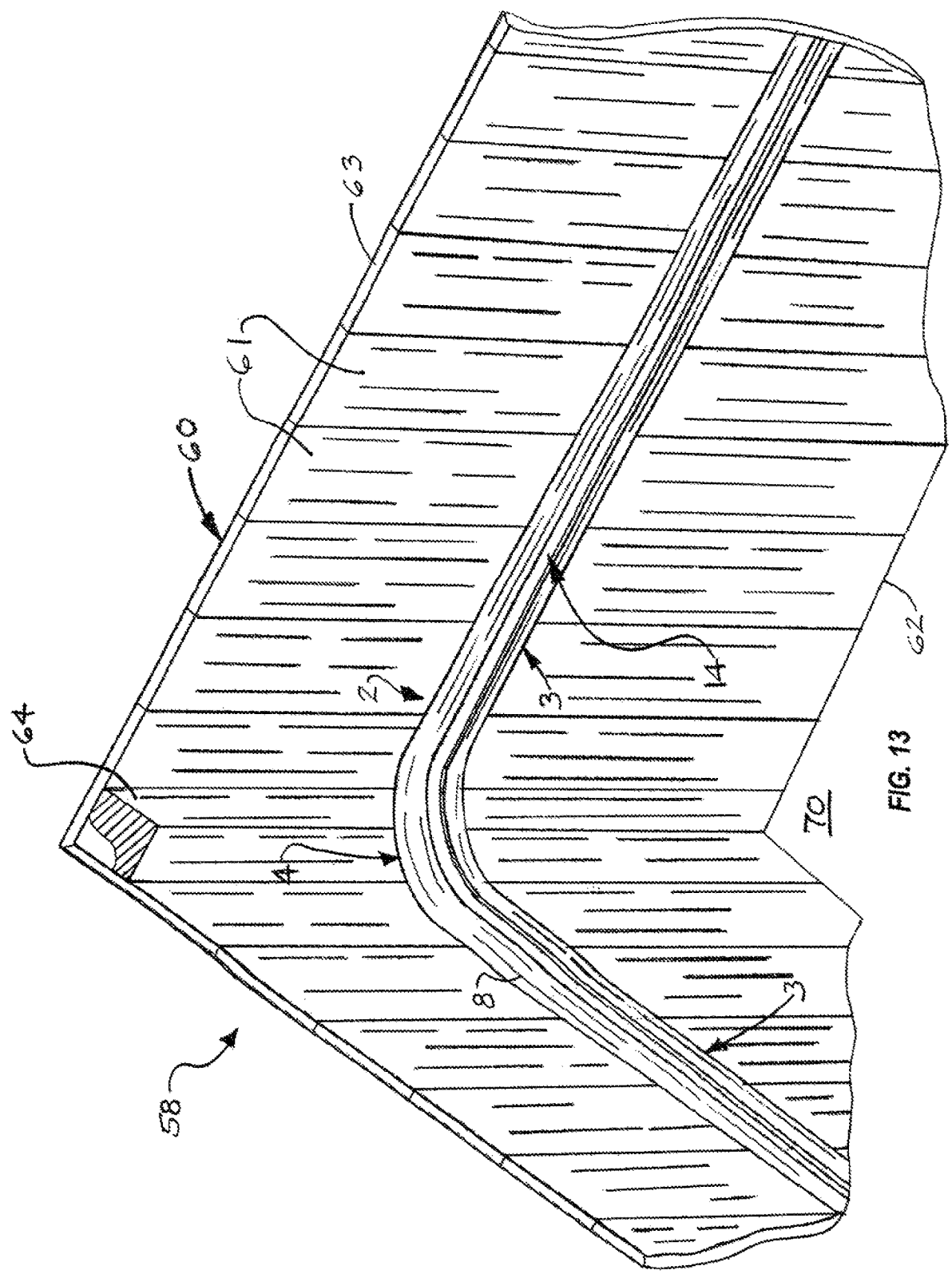
FIG. 13 is an inside view of a section of a board fence with a pair of straight track segments connected by a curved track segment mounted on an interior perimeter or surface of the fence according to some applications of the animal constraint systems.
Figure 14:
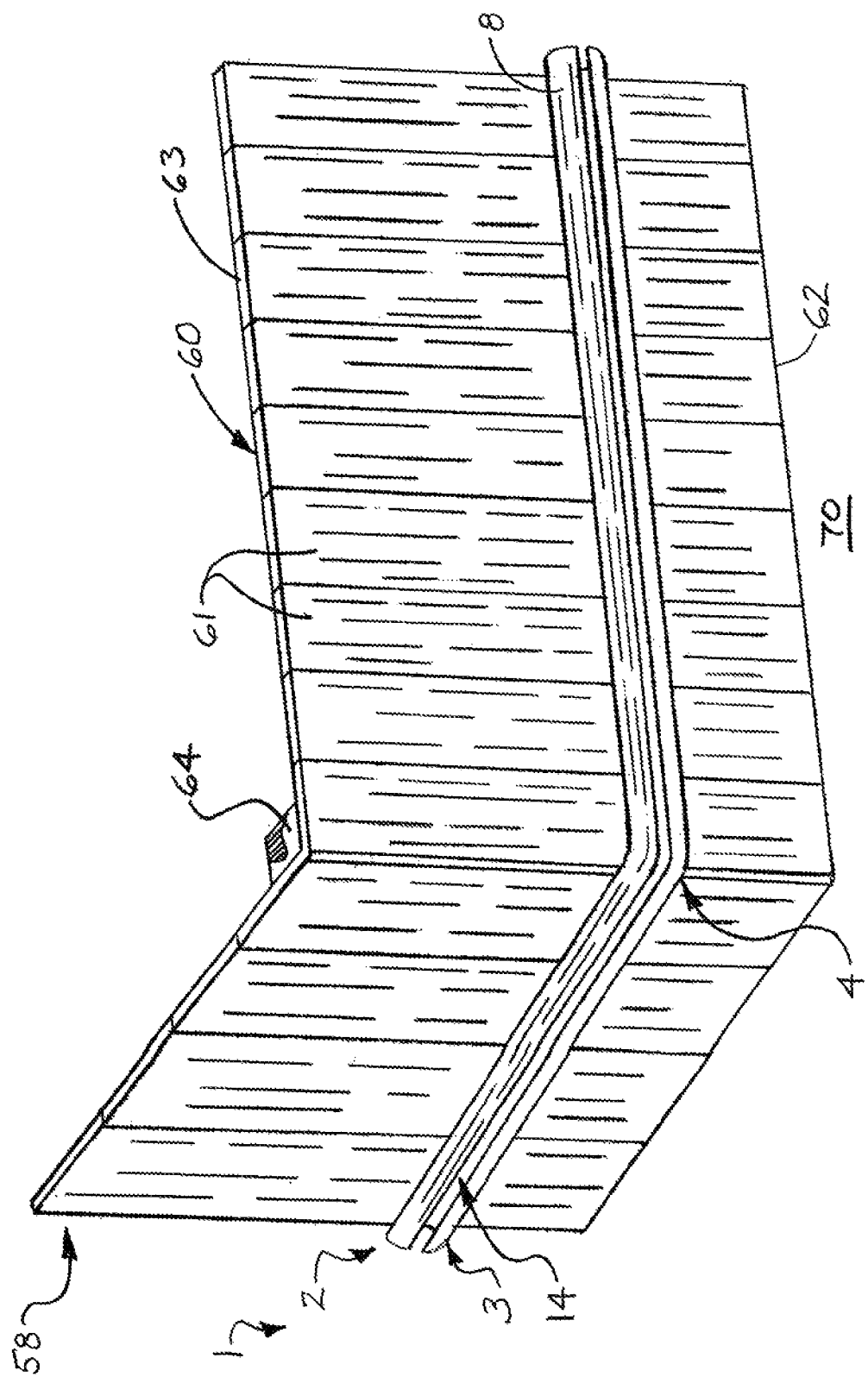
FIG. 14 is an outside view of a section of a board fence with a pair of straight track segments connected by a curved track segment mounted on an exterior perimeter or surface of the fence according to some applications of the animal constraint systems.

Referring initially to FIGS. 1-18 of the drawings, an illustrative embodiment of the animal constraint systems is generally indicated by reference numeral 1. As illustrated in FIGS. 1, 2 and 10 and will be hereinafter described, in some applications, the animal constraint system 1 may be suitable for providing a tethered dog or other animal 86 with the freedom to move along or adjacent to at least one anchoring structure 58 such as a fence, for example and without limitation, while constraining movement of the animal 86 away from the anchoring structure 58. In some applications, the anchoring structure 58 may include at least one fence 60, as illustrated. Accordingly, as illustrated in FIG. 1, the fence 60 may extend around the rear portion of a house 90 and may enclose a back yard 94. As illustrated in FIGS. 10, 13 and 14, in some applications, the fence 60 may include a wood fence with vertical, adjacent fence boards 61. As illustrated in FIG. 12, in some applications, the fence 60 may include a chain-link fence with one or more chain link fence panels 65. The fence 60 may have a fence bottom edge 62 and a fence top edge 63. As illustrated in FIGS. 13 and 14, in the case of a wood fence, vertical, periodically spaced-apart fence posts 64 may support the fence 60 in the ground or other supporting surface 70. In other applications, the anchoring structure 58 may include a house 90, a series of posts (not illustrated) and/or other building, structure or structures which is/are suitable for the purpose of providing primary support to the animal constraint system 1.

Figure 1:
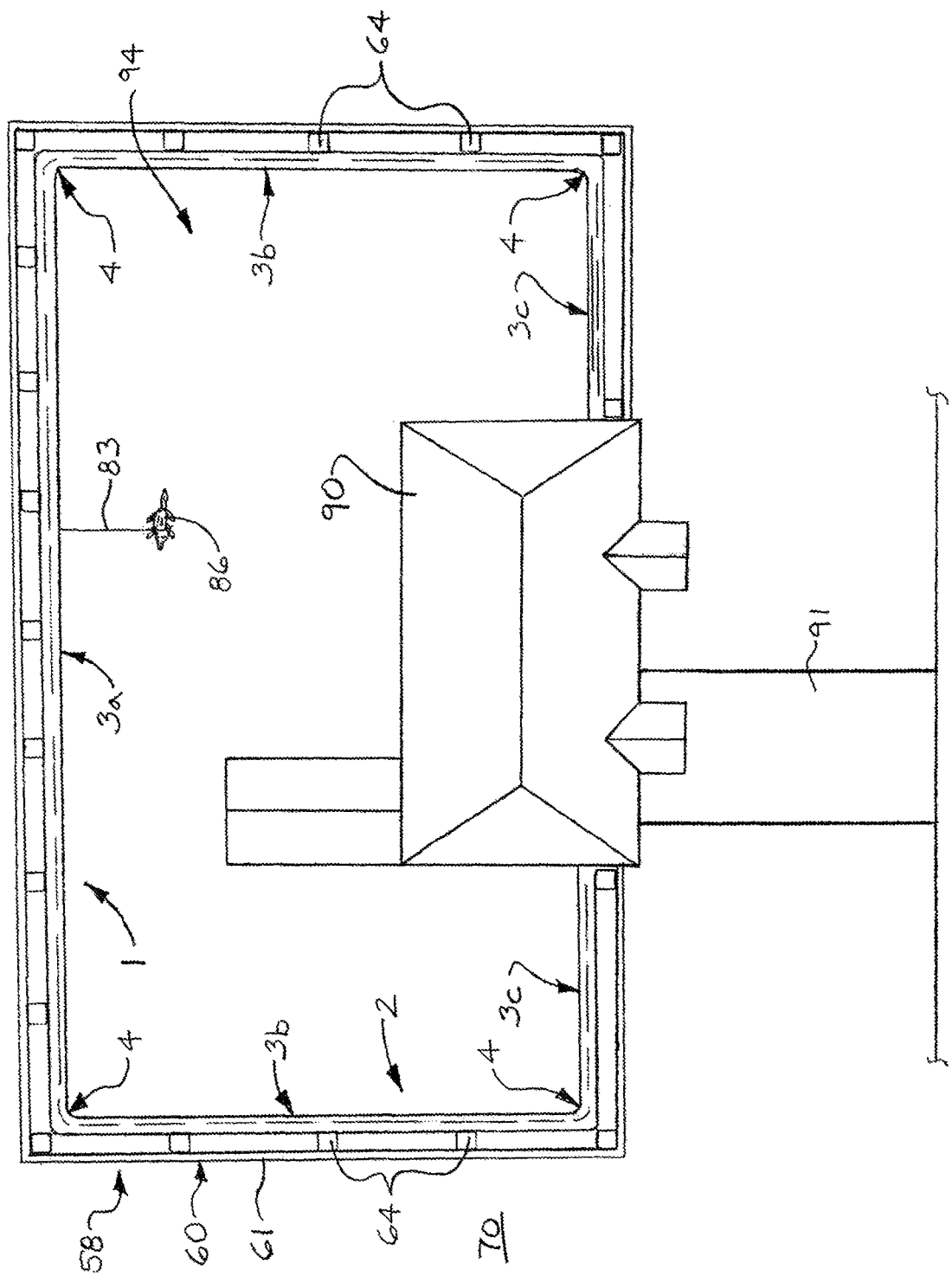
FIG. 1 is a top view of a fence as an anchoring structure which encloses a backyard behind a house, with an illustrative embodiment of the animal constraint systems installed on an inside surface or perimeter of the fence and tethering an animal to the fence in typical application of the animal constraint systems.
Figure 2:
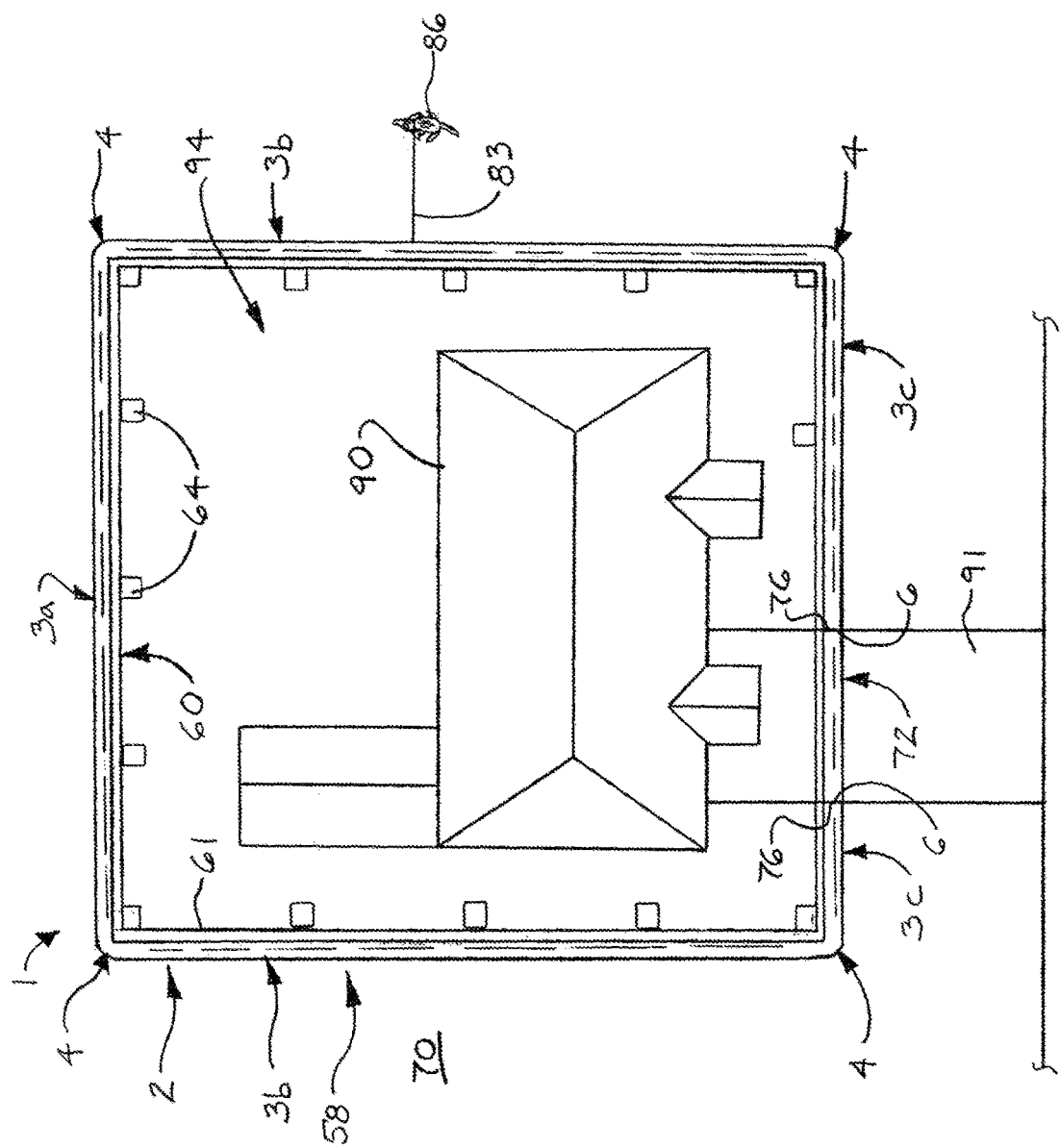
FIG. 2 is a top view of a fence as an anchoring structure which encloses a backyard behind a house, with an illustrative embodiment of the animal constraint systems installed on an outside surface or perimeter of the fence and tethering an animal to the fence in typical application of the animal constraint systems.

As illustrated in FIGS. 1 and 2, the animal constraint system 1 may include at least one track 2. The track 2 may be mounted on or attached to the anchoring structure 58 using brackets, clips, clamps, mechanical fasteners and/or other suitable technique (not illustrated) known by those skilled in the art. In some embodiments, the track 2 may include one or more straight track segments 3 which may be joined by one or more curved track segments 4 to follow the contour of the anchoring structure 58. In the non-limiting embodiment illustrated in FIGS. 1 and 2, the straight track segments 3 may include a rear straight track segment 3a, a pair of side straight track segments 3b and a pair of terminal straight track segments 3c. The curved track segments 4 may join the side straight track segments 3b to the rear straight track segment 3a and the terminal straight track segments 3c to the respective side straight track segments 3b. It will be recognized and understood that the track 2 may be fabricated in any size and shape including a triangular, rectangular or other polygonal shape or may be round or circular, oval or other shape typically depending on the shape or contour and size of the anchoring structure 58 on which the track 2 is mounted.

Figure 7:
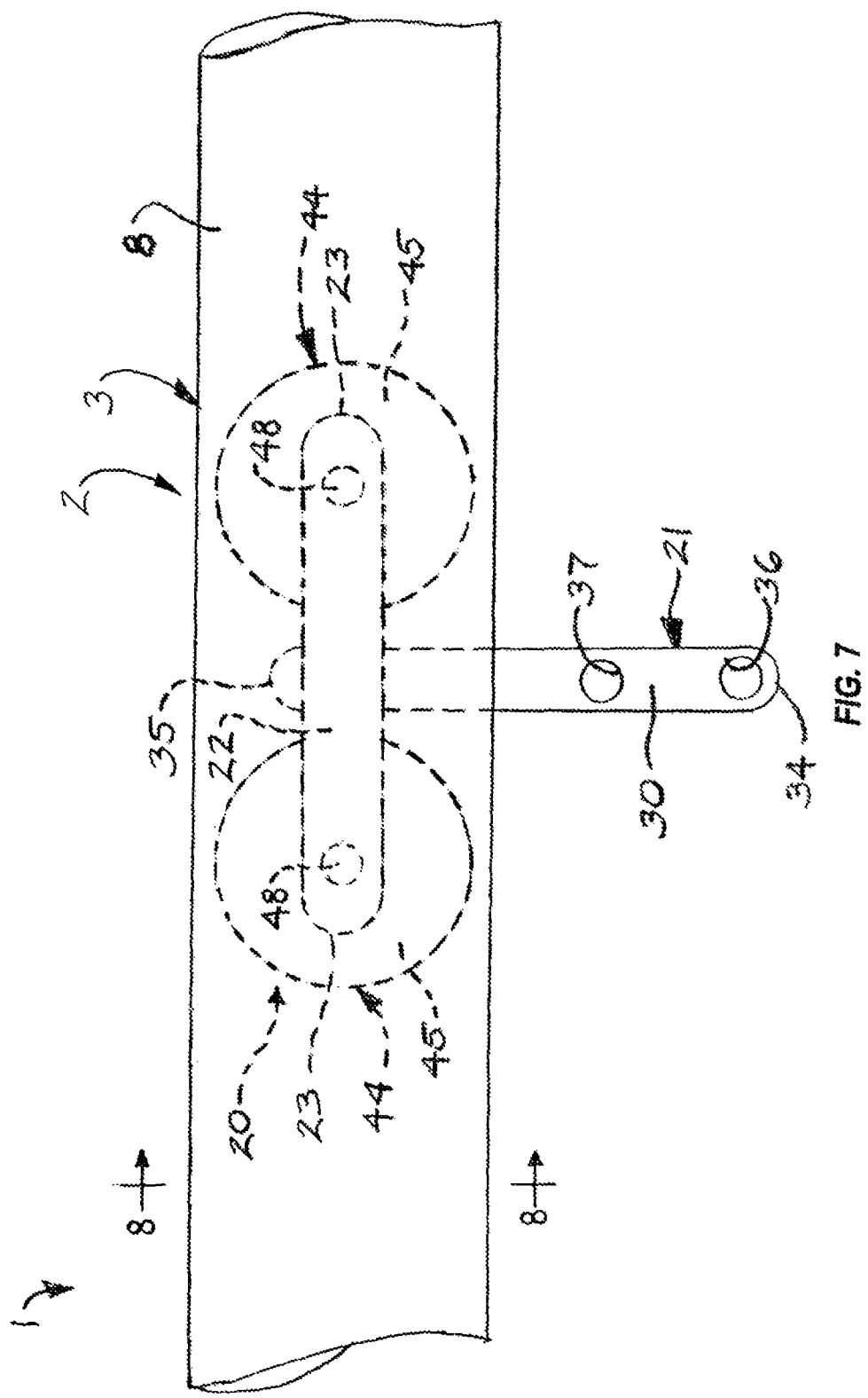
FIG. 7 is a top view of a portion of a straight track segment of a typical tubular track of the animal constraint systems, with a pair of carriage rollers (illustrated in phantom) of the carriage deployed inside the straight track segment to enable the carriage to longitudinally traverse the track.
Figure 15:
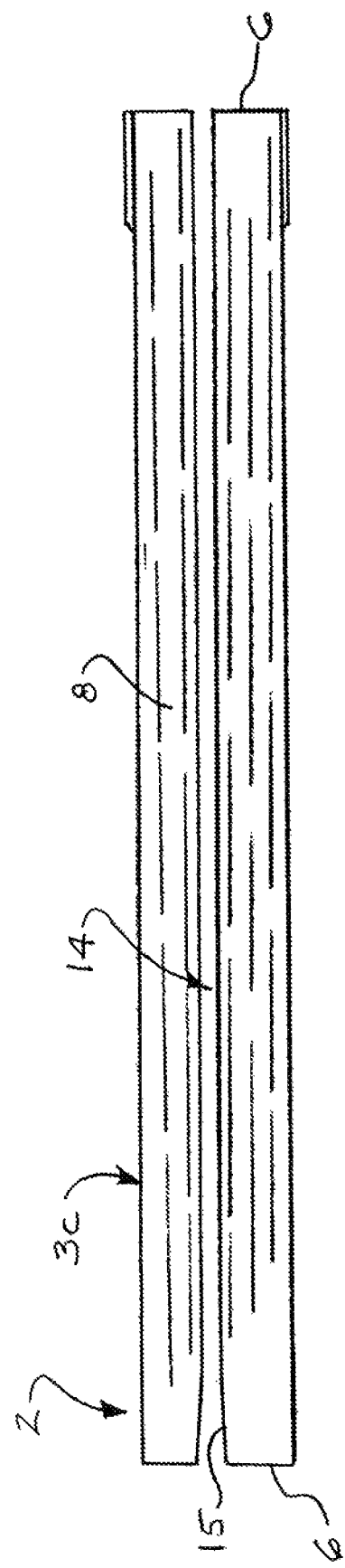
FIG. 15 is a top view of a typical terminal track segment of a tubular track, more particularly illustrating a beveled slot end of a track slot in the terminal track segment.
Figure 16:
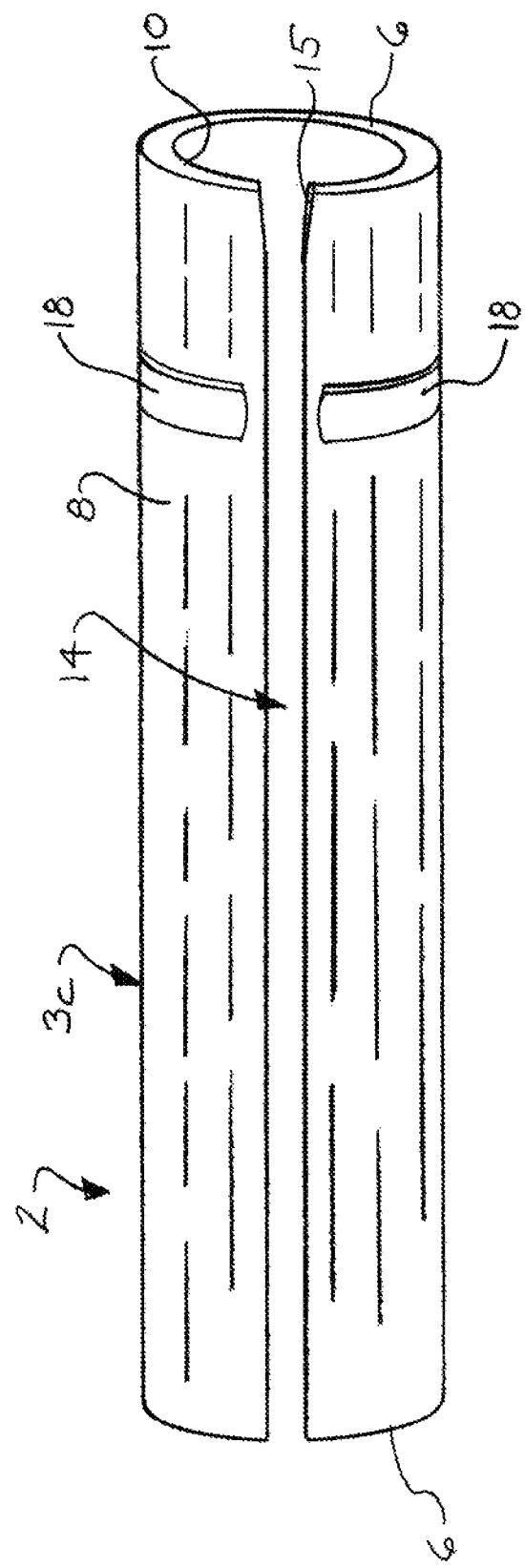
FIG. 16 is a perspective view of a typical terminal track segment of a tubular track with the track slot having the beveled slot end.

As illustrated in FIGS. 7-9, in some embodiments, the track 2 may be tubular with an elongated, generally cylindrical track wall 8. As illustrated in FIGS. 8 and 9, the track wall 8 may define a track interior 10 which may be coextensive with the track 2. A track slot 14 which communicates with the track interior 10 may extend through the track wall 8. The track slot 14 may be coextensive with the track 2. As illustrated in FIGS. 15 and 16, each terminal track segment 3c of the track 2 may have at least one track end 6. The track slot 14 may terminate at the track end or ends 6. In some embodiments, the track slot 14 may terminate at a beveled slot end 15 at the track end 6 for purposes which will be hereinafter described. As illustrated in FIG. 16, in some embodiments, at least one strap 18 may extend around at least a portion of the circumference of the track wall 8 for reinforcement purposes. In some embodiments, multiple straps 18 may be provided on the track wall 8 in spaced-apart relationship along the length of the track 2. Each strap 18 may be fabricated of a rigid or semi-rigid material and may enhance the rigidity of the track wall 8 as deemed necessary.

As further illustrated in FIGS. 7-9, at least one carriage 20 may be disposed in the track interior 10 to facilitate bidirectional travel of the carriage 20 along the length of the track 2. The carriage 20 may have any design which is suitable for the purpose. As illustrated in FIGS. 3-6, in some embodiments, the carriage 20 may have a carriage frame 21. As illustrated in FIG. 3, the carriage frame 21 may be generally "T"-shaped in top view with a pair of elongated, spaced-apart, upper and lower roller support frame members 22, as illustrated in FIG. 4. An elongated connecting frame member 30 may extend from between and in perpendicular relationship with respect to the roller support frame members 22.

Each roller support frame member 22 of the carriage frame 21 may have a pair of opposite frame member ends 23. At least one carriage roller 44 may be mounted for rotation between the roller support frame members 22 according to the knowledge of those skilled in the art. In some embodiments, a pair of spaced-apart carriage rollers 44 may be mounted for rotation between the roller support frame members 22, typically on opposite sides of the connecting frame member 30. Accordingly, as illustrated in FIGS. 7-9 and will be hereinafter further described, the carriage rollers 44 may be deployed inside the track interior 10 of the track 2 to facilitate free bidirectional linear movement or travel of the carriage 20 within and along the track 2. The connecting frame member 30 may protrude from the track interior 10 through the track slot 14 of the track 2 for purposes which will be hereinafter described.

As illustrated in FIGS. 3 and 4, the carriage rollers 44 may be mounted for rotation between the roller support frame members 22 according to the knowledge of those skilled in the art. Each carriage roller 44 may have a spherical roller body 45. As illustrated in FIGS. 4-6, a pair of flat, planar or truncated roller surfaces 46 may be provided in the roller body 45 at the respective opposite poles thereof. Each truncated roller surface 46 may accommodate the corresponding, typically flat or planar frame member end 23 of each corresponding roller support frame member 22.

Each carriage roller 44 may be mounted for rotation between the roller support frame members 22 according to the knowledge of those skilled in the art. Accordingly, as further illustrated in FIG. 3, in some embodiments, spaced-apart roller fastener openings 24 may extend through each roller support frame member 22 at or adjacent to the respective frame member ends 23. The upper and lower roller fastener openings 24 may be paired with each other at the corresponding frame member ends 23 of the respective upper and lower roller support frame members 22. At least one roller fastener 48 may extend through the paired roller fastener openings 24 in the respective roller support frame members 22 and through a registering fastener opening (not illustrated) which extends diametrically through the roller body 45 of each corresponding carriage roller 44. Accordingly, each carriage roller 44 may be capable of freely rotating bidirectionally between the roller support frame members 22 at or adjacent to the corresponding frame member ends 23. Alternative techniques known by those skilled in the art may be used to mount the carriage rollers 44 between the roller support frame members 22.

As illustrated in FIGS. 3 and 6, the connecting frame member 30 of the carriage frame 21 may have a proximal frame member end 34 and a distal frame member end 35. As illustrated in FIG. 3, at least one clip opening 36 may extend through the connecting frame member 30 typically at or adjacent to the proximal frame member end 34. At least one camera opening 37 may extend through the connecting frame member 30 typically between the clip opening 36 and the distal frame member end 35.

The connecting frame member 30 may be mounted between the roller support frame members 22 according to the knowledge of those skilled in the art. In some embodiments, at least one fastener opening 38 (FIG. 6) may extend through the connecting frame member 30 typically at or adjacent to the distal frame member end 35. Upper and lower connecting member fastener openings 26 (FIGS. 3 and 6) may extend through the respective upper and lower roller support frame members 22 between the roller fastener openings 24. At least one connecting member fastener 40 may extend through the connecting member fastener openings 26 and the registering fastener opening 38 in the connecting frame member 30 to attach or secure the connecting frame member 30 between the roller support frame members 22.

As illustrated in FIGS. 4 and 6, in some embodiments, a pair of fastener sleeves 41 may be mounted on the connecting member fastener 40. The connecting frame member 30 may be disposed between the fastener sleeves 41. Accordingly, the fastener sleeves 41 may constrain movement of the connecting member 30 to the middle portion of the connecting member fastener 40.

As illustrated in FIGS. 7-10, in typical assembly of the animal constraint system 1, which will be hereinafter described, the carriage 20 may be mounted such that the carriage rollers 44 are disposed in the track interior 10 of the track 2. The connecting frame member 30 of the carriage frame 21 may protrude from the track interior 10 through the track slot 14 with the clip opening 36 and camera opening 37 typically disposed outside the track interior 10, as illustrated in FIGS. 7 and 9. Accordingly, responsive to application of a linear force parallel to the track 2, the carriage 20 may be capable of bidirectionally traversing the length of the track 2 as the carriage rollers 44 typically engage the interior surface of the track wall 8 and the connecting frame member 30 traverses the track slot 14.

Figure 17:
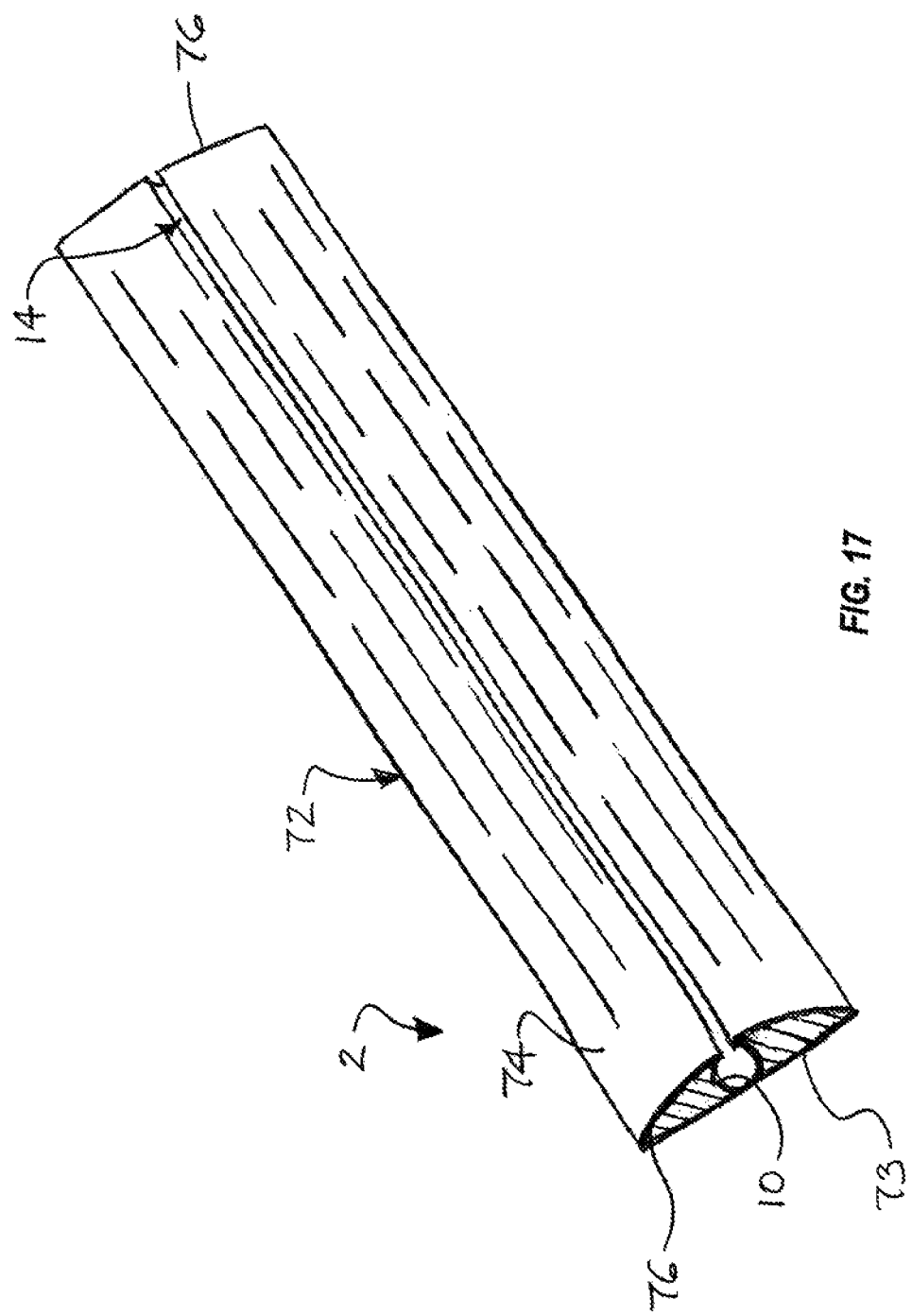
FIG. 17 is a perspective view of a typical bump track segment of the track according to some embodiments of the animal constraint systems.
Figure 18:
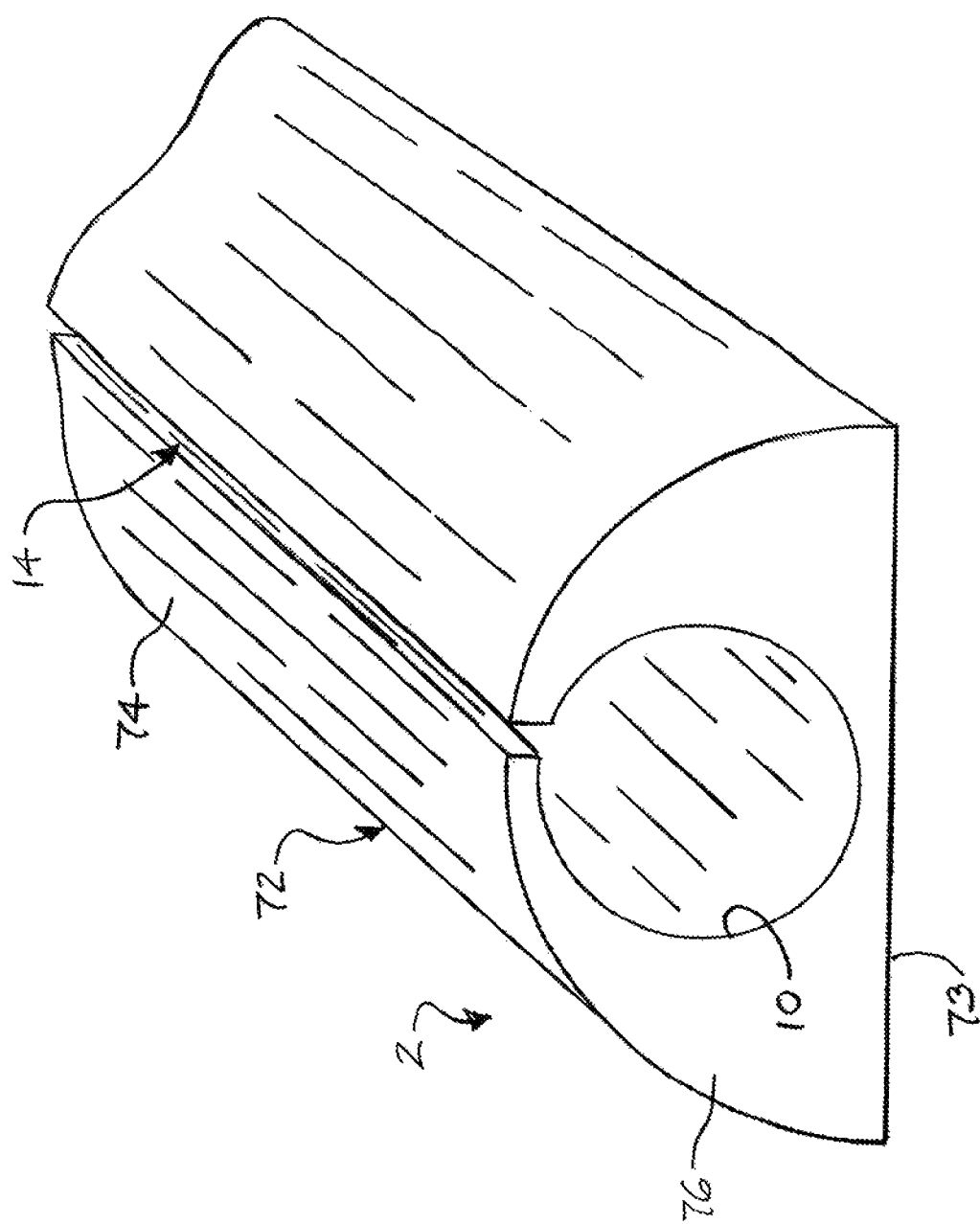
FIG. 18 is an enlarged perspective view of an end portion of the bump track segment illustrated in FIG. 17, partially in section.

As illustrated in FIGS. 2, 17 and 18, in some embodiments, the track 2 may include a bump track segment 72 which may extend between the track ends 6 of respective terminal track segments 3c (FIG. 2). As illustrated in FIGS. 17 and 18, the bump track segment 72 may have a pair of track segment ends 76 which may mate with the track ends 6 of the respective terminal track segments 3c. A flat or planar bottom track surface 73 may extend between the track segment ends 76. A convex track surface 74 may extend from the bottom track surface 73. The track slot 14 may extend through the convex track surface 74 to the track interior 10 and open to the track segment ends 76. Accordingly, as illustrated in FIG. 2, in some applications, the bump track segment 72 may extend across the width of a driveway 91 which may extend from the house 90 to a street 92. Thus, the bump track segment 72 may establish continuity between the terminal track segments 3c to provide a continuous track 2 which the tethered animal 86 may freely traverse without hindrance. Automobiles and other vehicles (not illustrated) may traverse the bump track segment 72 as the automobiles or vehicles traverse the driveway 91 between the house 90 and the street 92.

As illustrated in FIGS. 1, 2 and 7-14, in typical application of the animal restraint system 1, the track 2 may be mounted on the anchoring structure 58 using brackets, clips, clamps, mechanical fasteners and/or other suitable technique (not illustrated) known by those skilled in the art. As illustrated in FIGS. 1 and 13, in some non-limiting applications, the track 2 may be mounted on an interior perimeter or surface of a fence 60 as the anchoring structure 58. As illustrated in FIGS. 2 and 14, in other non-limiting applications, the track 2 may be mounted on an exterior perimeter or surface of the fence 60. As illustrated in FIG. 12, in still other non-limiting applications, the track 2 may be mounted on the fence top edge 63 of the fence 60. In other applications, the track 2 may be mounted at the fence bottom edge 62 and/or at any desired level between the fence bottom edge 62 and the fence top edge 63. The track 2 may include any number of straight track segments 3 which may be joined by any number of curved track segments 4, or may have one continuous straight track segment 3 or curved track segment 4, as necessary to follow the contour of the fence 60 or other anchoring structure 58.

The carriage 20 may be deployed in place in the track 2 by inserting the carriage rollers 44 in the track interior 10 as the connecting frame member 30 of the carriage frame 21 is inserted in the track slot 14 typically at an end of one of the terminal track segments 3c. As was heretofore described with respect to FIGS. 15 and 16, in some embodiments, the track slot 14 of one or both of the terminal track segments 3c may have the beveled slot end 15 to facilitate ease of inserting the connecting frame member 30 into the track slot 14.

As illustrated in FIGS. 8-11, the animal 86 (FIG. 10) may be tethered to the protruding connecting frame member 30 on the carriage frame 21 of the carriage 20 typically by attachment of a clip 82 (FIG. 8) to the clip opening 36 in the connecting frame member 30. One end of a tether line 83 (FIG. 10) may be attached to the clip 82. As illustrated in FIG. 10, the other end of the tether line 83 may be attached to a collar, harness or the like 87 on the animal 86. Accordingly, the animal 86 may walk or run freely in either direction along and adjacent to the fence 60 as the tether line 83 constrains movement of the animal 86 away from the structure 58. Hence, the animal constraint system 1 may facilitate exercise and freedom of movement of the animal 86 while preventing the animal 86 from running away from the anchoring structure 58 and becoming lost or attacking or biting other animals or persons in the area.

Figure 11:
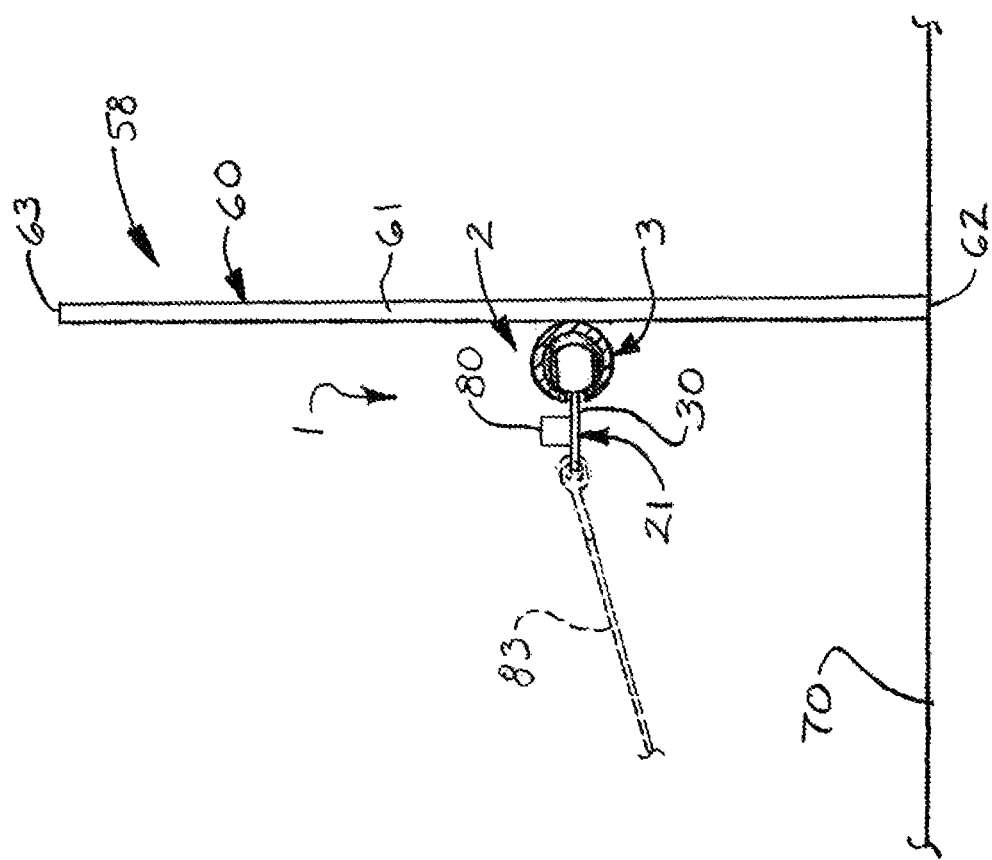
FIG. 11 is a side view of a fence with a straight track segment (illustrated in cross-section) of the tubular track mounted on the fence and the carriage mounted inside the straight track segment for traversing the track, more particularly illustrating a tether line (illustrated in phantom) attached to the carriage to facilitate attachment of an animal (not illustrated) to the carriage and a camera mounted on the carriage in typical application of the animal constraint systems.

As illustrated in FIGS. 9 and 11, in some applications, a video camera 80 may be attached to the connecting frame member 30 of the carriage frame 21 such as by extending a camera mount fastener (not illustrated) which extends from the video camera 80 through the camera opening 37 and threading a securing nut on the camera mount fastener. A video monitor (not illustrated) may interface with the video camera 80. The video monitor may be provided in the house 90 (FIGS. 1 and 2) or in any other suitable location to enable a caregiver of the animal 86 to watch and monitor the location of the animal 86 as the animal 86 remains tethered to the carriage 20.

Figure 19:
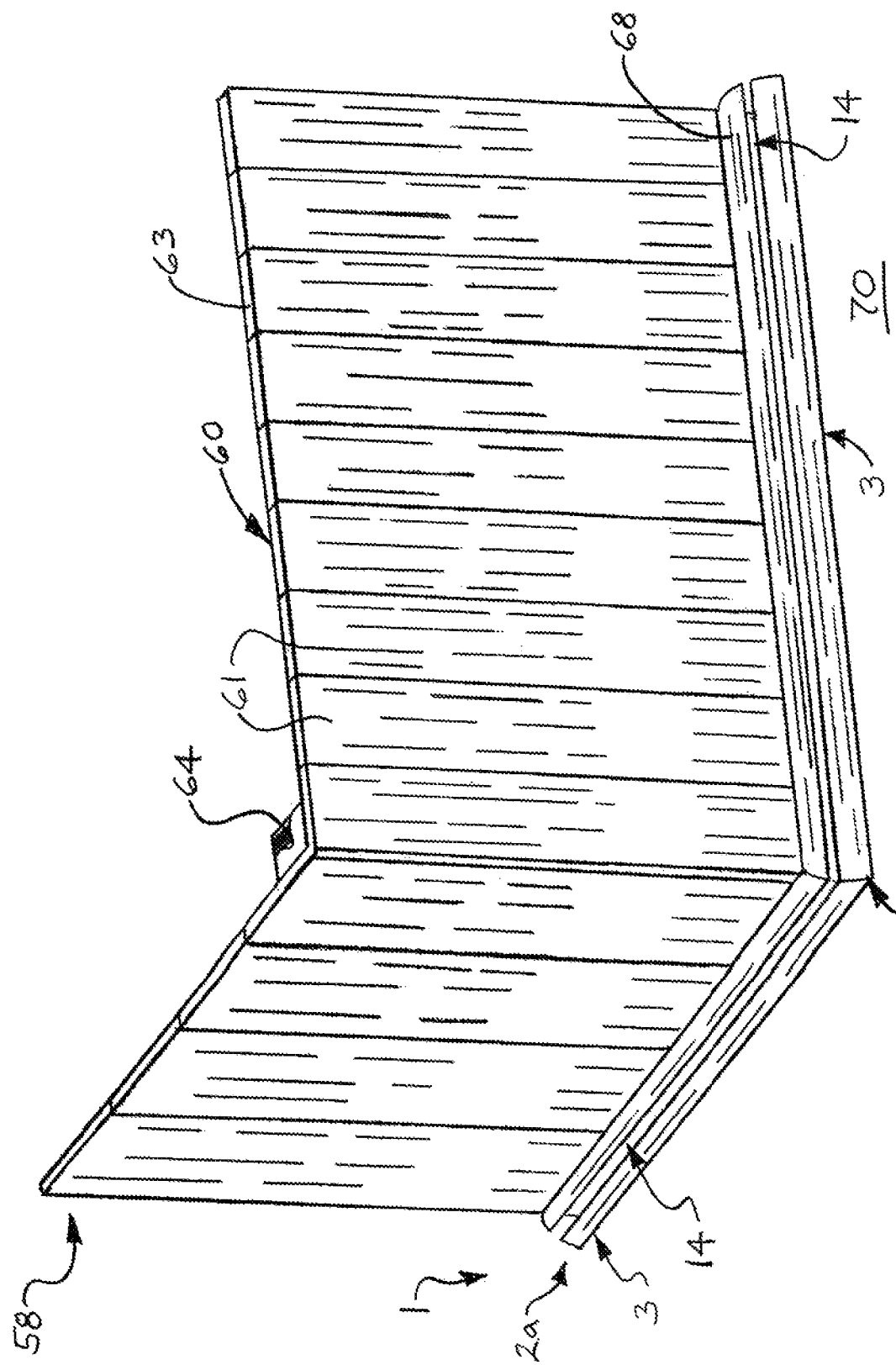
FIG. 19 is an outside view of a section of a board fence with a pair of straight track segments of a rail track mounted on an exterior perimeter or surface of the fence along the fence bottom edge according to some applications of the animal constraint systems.
Figure 20:
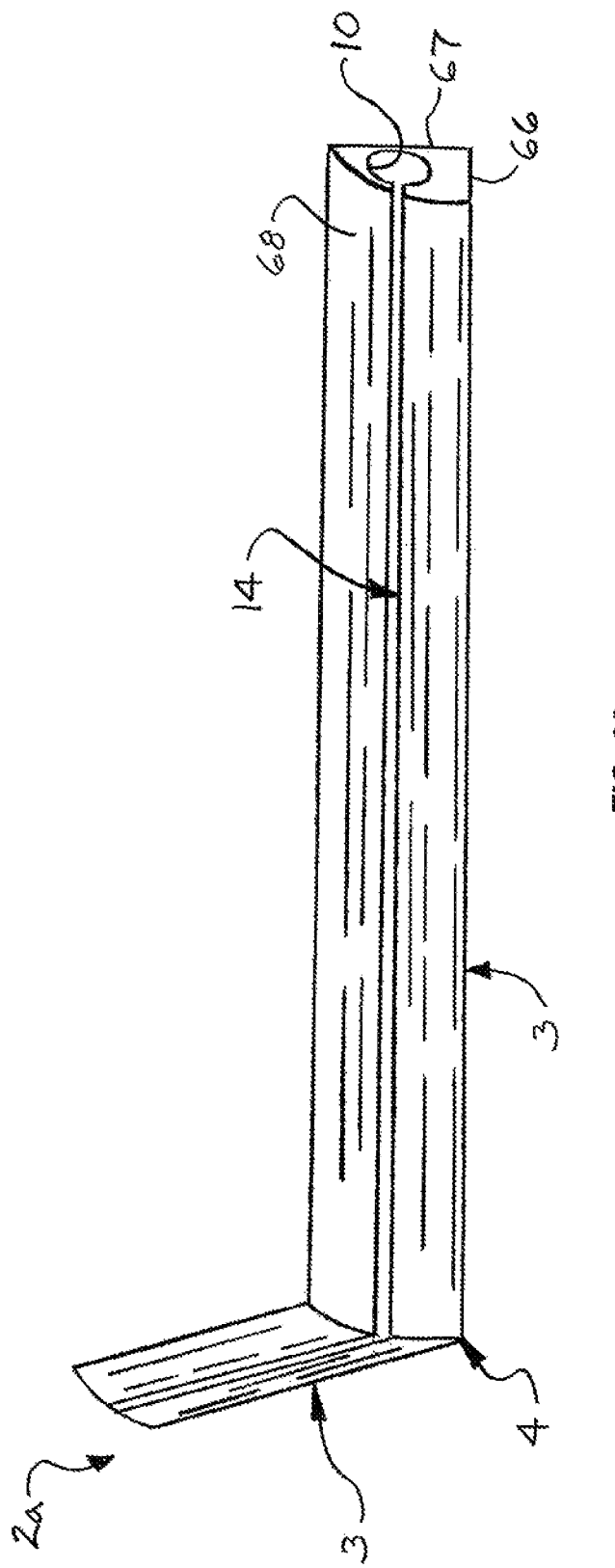
FIG. 20 is pair of angled straight track segments of the rail track illustrated in FIG. 19, in the form of track molding which can be deployed along an interior or exterior wall surface of a wall in a building or an interior or exterior fence surface of a fence in some applications of the animal constraint systems.

Referring next to FIGS. 19 and 20 of the drawings, in some embodiments, the animal restraint system 1 may have a rail track 2a which may be placed at or adjacent to the fence bottom edge 62 of the fence 60. As illustrated in FIG. 20, the rail track 2a may have a flat or planar bottom track surface 66. A flat or planar rear track surface 67 may extend at a right angle from the bottom track surface 66. A convex track surface 68 may extend between the bottom track surface 66 and the rear track surface 67. Accordingly, the rail track 2a may be deployed by placement of the bottom track surface 66 on or adjacent to the ground or other supporting surface 70 (FIG. 19), typically along the fence bottom edge 62 of the fence 60. The rail track 2a may include one or more straight track segments 3, one or more curved track segments 4 and/or a continuous straight track segment 3 or curved track segment 4 depending on the contour or trajectory which is necessary to follow the contour or trajectory of the anchoring structure 58. In some applications, the rail track 2a may be used in combination with the bump track segment 72 (FIGS. 2, 17 and 18) to provide continuity of the rail track 2a across a driveway 91 or the like, as was heretofore described. In some applications, the rail track 2a may be deployed in the form of track molding along an interior or exterior wall surface of a wall in the house 90 or other building. As further illustrated in FIG. 20, in some embodiments, the curved track segment or segments 4 of the rail track 2a may have a sharp transition, as illustrated. In other embodiments, the curved track segment or segments 4 of the rail track 2a may have a gradual, curved transition, depending on the contour of the anchoring structure 58 to which the rail track 2a is applied.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, I claim:

1. An animal constraint system configured for mounting on an anchoring structure and providing an animal with the freedom to move along or adjacent to the anchoring structure while constraining movement of the animal away from the anchoring structure, comprising:
   at least one track suitably configured for mounting on the anchoring structure, the at least one track having a track interior, the at least one track comprising a rail track having a flat or planar bottom track surface, a flat or planar rear track surface extending at a right angle from the bottom track surface and a convex track surface extending between the bottom track surface and the rear track surface;
   a track slot in the at least one track, the track slot extending through the convex track surface to the track interior and communicating with the track interior; and
   a carriage disposed for linear movement in the track interior of the track and protruding from the track interior through the track slot, the carriage including:
      a carriage frame; and
      at least one carriage roller rotatably carried by the carriage frame and disposed in the track interior of the track; and
   a tether line connected to the carriage frame, the tether line configured for connection to the animal.

2. The animal constraint system of claim 1 wherein the at least one track comprises at least one straight track segment and at least one curved track segment extending from the at least one straight track segment.

3. The animal constraint system of claim 1 wherein the carriage frame of the carriage comprises a pair of elongated, spaced-apart, first and second roller support frame members, and the at least one carriage roller is rotatably disposed between the first and second roller support frame members.

4. The animal constraint system of claim 3 wherein the at least one carriage roller comprises at least one spherical carriage roller body disposed for rotation between the first and second roller support frame members.

5. The animal constraint system of claim 4 further comprising a pair of flat, planar or truncated roller surfaces at respective opposite poles of the at least one spherical carriage roller body of the at least one carriage roller, the truncated roller surfaces accommodating the first and second roller support frame members, respectively.

6. The animal constraint system of claim 3 further comprising an elongated connecting frame member extending from, between and in perpendicular relationship with respect to the first and second roller support frame members and through the track slot of the at least one track, and wherein the tether line is connected to the connecting frame member.

7. The animal constraint system of claim 6 further comprising at least one connecting member fastener securing the connecting frame member between the first and second roller support frame members and a pair of fastener sleeves disposed on the at least one connecting member fastener, and wherein the connecting frame member is disposed between the pair of fastener sleeves, whereby the pair of fastener sleeves constrain movement of the connecting frame member to a middle portion of the at least one connecting member fastener.

8. An animal constraint system configured for mounting on an anchoring structure and providing an animal with the freedom to move along or adjacent to the anchoring structure while constraining movement of the animal away from the anchoring structure, comprising:
   at least one track suitably configured for mounting on the anchoring structure, the at least one track having a track interior, the at least one track comprising a rail track having a flat or planar bottom track surface, a flat or planar rear track surface extending at a right angle from the bottom track surface and a convex track surface extending between the bottom track surface and the rear track surface;

a track slot in the at least one track, the track slot extending through the convex track surface to the track interior and communicating with the track interior; and a carriage disposed for linear movement in the track interior of the track and protruding from the track interior through the track slot, the carriage including:
   a carriage frame; and
   a pair of spaced-apart carriage rollers rotatably carried by the carriage frame and disposed in the track interior of the track, each of the carriage rollers having a spherical carriage roller body; and
   a tether line connected to the carriage frame, the tether line configured for connection to the animal.

9. The animal constraint system of claim 8 wherein the at least one track comprises at least one straight track segment and at least one curved track segment extending from the at least one straight track segment.

10. The animal constraint system of claim 8 wherein the carriage frame of the carriage comprises a pair of elongated, spaced-apart, first and second roller support frame members, and the carriage rollers are rotatably disposed between the first and second roller support frame members.

11. The animal constraint system of claim 10 further comprising a pair of flat, planar or truncated roller surfaces at respective opposite poles of the spherical carriage roller body of the carriage rollers, the truncated roller surfaces accommodating the first and second roller support frame members, respectively, of the carriage frame.

12. The animal constraint system of claim 10 further comprising an elongated connecting frame member extending from, between and in perpendicular relationship with respect to the first and second roller support frame members and through the track slot of the at least one track, and wherein the tether line is connected to the connecting frame member.

13. The animal constraint system of claim 12 further comprising at least one connecting member fastener securing the connecting frame member between the first and second roller support frame members and a pair of fastener sleeves disposed on the at least one connecting member fastener, and wherein the connecting frame member is disposed between the pair of fastener sleeves, whereby the pair of fastener sleeves constrain movement of the connecting frame member to a middle portion of the at least one connecting member fastener.

14. An animal constraint system configured for mounting on an anchoring structure and providing an animal with the freedom to move along or adjacent to the anchoring structure while constraining movement of the animal away from the anchoring structure, comprising:
   at least one tubular track having an elongated, cylindrical track wall suitably configured for mounting on the anchoring structure, the track wall forming a track interior, the at least one track comprising a rail track having a flat or planar bottom track surface, a flat or planar rear track surface extending at a right angle from the bottom track surface and a convex track surface extending between the bottom track surface and the rear track surface;
   a track slot in the track wall of the at least one track, the track slot extending through the convex track surface to the track interior and communicating with the track interior; and
   a carriage disposed for linear movement in the track interior of the track, the carriage including:
      a carriage frame having:
         a pair of elongated, spaced-apart, first and second roller support frame members;
         a pair of spaced-apart carriage rollers rotatably mounted for rotation between the first and second roller support frame members and disposed in the track interior of the at least one track, each of the carriage rollers having a spherical carriage roller body;
         an elongated connecting frame member extending from, between and in perpendicular relationship with respect to the first and second roller support frame members and through the track slot of the at least one track;
         at least one connecting member fastener extending between the first and second roller support frame members and through the connecting frame member; and
         a pair of fastener sleeves disposed on the at least one connecting member fastener, with the at least one connecting frame member disposed between the pair of fastener sleeves, the pair of fastener sleeves constrain movement of the connecting frame member to a middle portion of the at least one connecting member fastener; and
      a tether line connected to the connecting frame member of the carriage frame, the tether line configured for connection to the animal.

15. The animal constraint system of claim 14 further comprising a pair of flat, planar or truncated roller surfaces at respective opposite poles of the spherical carriage roller body of the carriage rollers, the truncated roller surfaces accommodating the first and second roller support frame members, respectively, of the carriage frame.

16. The animal constraint system of claim 14 wherein the at least one track comprises at least one straight track segment and at least one curved track segment extending from the at least one straight track segment.

17. The animal constraint system of claim 14 further comprising a video camera carried by the connecting frame member of the carriage frame.

\* \* \* \* \*